(12) United States Patent
Townsend et al.

(10) Patent No.: US 8,939,020 B2
(45) Date of Patent: Jan. 27, 2015

(54) SPHERICAL MONITORING DEVICE FOR PNEUMATIC TIRES

(71) Applicant: Caterpillar Inc., Peoria, IL (US)

(72) Inventors: Gene A. Townsend, Dunlap, IL (US);
Gregory J. Parsons, Peoria, IL (US);
David R. Meinhold, Metamora, IL (US);
Joseph J. Every, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 37 days.

(21) Appl. No.: 13/705,214

(22) Filed: Dec. 5, 2012

(65) Prior Publication Data
US 2014/0150542 A1    Jun. 5, 2014

(51) Int. Cl.
*G01M 17/02*    (2006.01)
(52) U.S. Cl.
CPC .................................. *G01M 17/02* (2013.01)
USPC ......................................................... 73/146
(58) Field of Classification Search
USPC ................................. 73/146–146.8
See application file for complete search history.

(56) References Cited

U.S. PATENT DOCUMENTS

| | | | |
|---|---|---|---|
| 4,067,235 A | 1/1978 | Markland et al. | |
| 6,082,192 A | 7/2000 | Koch et al. | |
| 6,178,814 B1* | 1/2001 | Curtis | 73/146 |
| 6,360,594 B1 | 3/2002 | Koch et al. | |
| 6,516,660 B1 | 2/2003 | Koch et al. | |
| 6,543,277 B2 | 4/2003 | Koch et al. | |
| 6,722,191 B2 | 4/2004 | Koch et al. | |
| 6,910,372 B2 | 6/2005 | Wilson | |
| 6,966,221 B2 | 11/2005 | Wilson et al. | |
| 7,278,307 B2 | 10/2007 | Wilson et al. | |
| 2003/0150261 A1* | 8/2003 | Koch et al. | 73/146 |
| 2006/0070230 A1 | 4/2006 | Logan et al. | |
| 2010/0164705 A1 | 7/2010 | Blanchard | |

FOREIGN PATENT DOCUMENTS

EP         2233324         12/2011

\* cited by examiner

*Primary Examiner* — Andre Allen
(74) *Attorney, Agent, or Firm* — Finnegan, Henderson, Farabow, Garrett & Dunner LLP

(57) ABSTRACT

A monitoring device and system for monitoring the conditions inside a pneumatic tire are disclosed. The monitoring device includes a sensor unit, a shell, and an encapsulant. The monitoring device is designed to roll on the inside of a tire or to float on a liquid inside of a tire.

26 Claims, 8 Drawing Sheets

SPHERICAL MONITORING DEVICE FOR PNEUMATIC TIRES

TECHNICAL FIELD

The present disclosure relates generally to pneumatic tires, and specifically to a robust package for wireless sensors that monitor the condition of such tires.

BACKGROUND

It is often desirable to monitor the conditions inside a pneumatic tire while the tire is installed and in use on a vehicle. Examples of conditions to be monitored include pressure and temperature. Difficulties arise when trying to gain access inside the tire without removing the tire for inspection. Further, it is very difficult to apply a measurement device to the valve stem of a tire while it is rotating. Therefore, various systems have been developed to provide a wireless sensor on or inside the tire.

Large off-highway vehicles such as mine haul trucks and wheel loaders provide an additional incentive to provide a suitable wireless monitoring solution. Tire replacement cost for vehicles such as these are typically tens of thousands of dollars, and early detection of a tire failure is essential in preventing permanent damage. Further, these vehicles operate on dirt roads where tire-damaging rocks and other debris are common.

Autonomous vehicles provide a further incentive for providing a suitable wireless monitoring solution. An example of such a feature would be an autonomous haul truck used for mining applications. By nature, there is no operator present that could detect problems with a tire during operation. A tire monitoring system is therefore required to prevent operation of the vehicle after tire deflation or damage.

Mounting a suitable monitoring device onto or inside the tire has been a known challenge. A monitoring device mounted outside the tire or rim is subject to being struck by debris and damaged. A monitoring device mounted inside the tire or rim is subject to different environmental challenges. These include high pressure, high oxygen content, and exposure to liquids designed to increase tire performance. Further, methods of attaching a monitoring device inside the tire present challenges. One solution is to attach the monitoring device to the rim by connecting the monitoring device to a band that is wrapped around the circumference of the rim. However, some vehicle rims do not have a recessed section of the rim to create a cavity for the band connection solution. Thus, the monitoring device would be knocked off the rim by the tire bead when the tire is installed on the rim. Another solution is to attach the monitoring device to the inside of the tire. However, it is known that the tire flexes as it contacts the ground and supports the vehicle. The flexing of the tire therefore makes attachment difficult.

One solution is disclosed by U.S. Pat. No. 6,082,192 to Koch et al on Jul. 4, 2000. Koch et al discloses a spherical monitoring assembly that is inserted into the air chamber formed between the tire and rim. The curvature of the assembly is sufficient to enable the assembly to roll on the inside of the tire. However, the '192 patent has no provision to communicate temperature changes from outside the assembly to the sensor. Further, the transfer gel used in the '192 patent is not robust enough to withstand the shock, vibration, and high-g loads seen in the intended application. Still further, the use of a breathing tube limits communication of ambient conditions to the sensor and makes attachment to the sensor inconvenient.

U.S. Pat. No. 6,543,277 to Koch et al on Apr. 8, 2003 discloses a spherical monitoring assembly that has a specific gravity of less than one such that it will float on liquids contained within the tire. The '277 patent also discloses an external weight adapted to position the sensor in a predictable configuration, i.e. such that the sensor inlet is exposed to air instead of liquid. However, the external weight is problematic for at least two reasons. First, the external mass that enables a predictable configuration when floating is poorly suited to allowing the monitoring assembly to roll on the inside of the tire in the absence of liquid. The resulting poor balance will impart undue shock and vibration on the monitoring assembly, much as an unbalanced tire does when rolling down the road. Second, the external weight will cause the monitoring assembly to jump off of the inside of the tire whenever the external mass contacts the inside of the tire.

SUMMARY OF THE INVENTION

In one aspect of the current disclosure, a monitoring device for use inside a pneumatic tire is disclosed. The monitoring device comprises a sensor unit, an encapsulant surrounding the sensor unit, and a spherical shell formed by combining hemispherical halves. The spherical shell comprises a vent and a vent guard, wherein the spherical shell surrounds the encapsulant.

In another aspect of the current disclosure, a system for monitoring conditions inside a pneumatic tire is disclosed. The system comprises a vehicle control system in communication with a receiver unit. The receiver unit is configured to communicate with a monitoring device. The monitoring device comprises a sensor unit. The sensor unit comprises an encapsulant surrounding the sensor unit, and a spherical shell formed by combining hemispherical halves. The spherical shell comprises a vent, and a vent guard, wherein the spherical shell surrounds the encapsulant.

DETAILED DESCRIPTION

Figure 1:
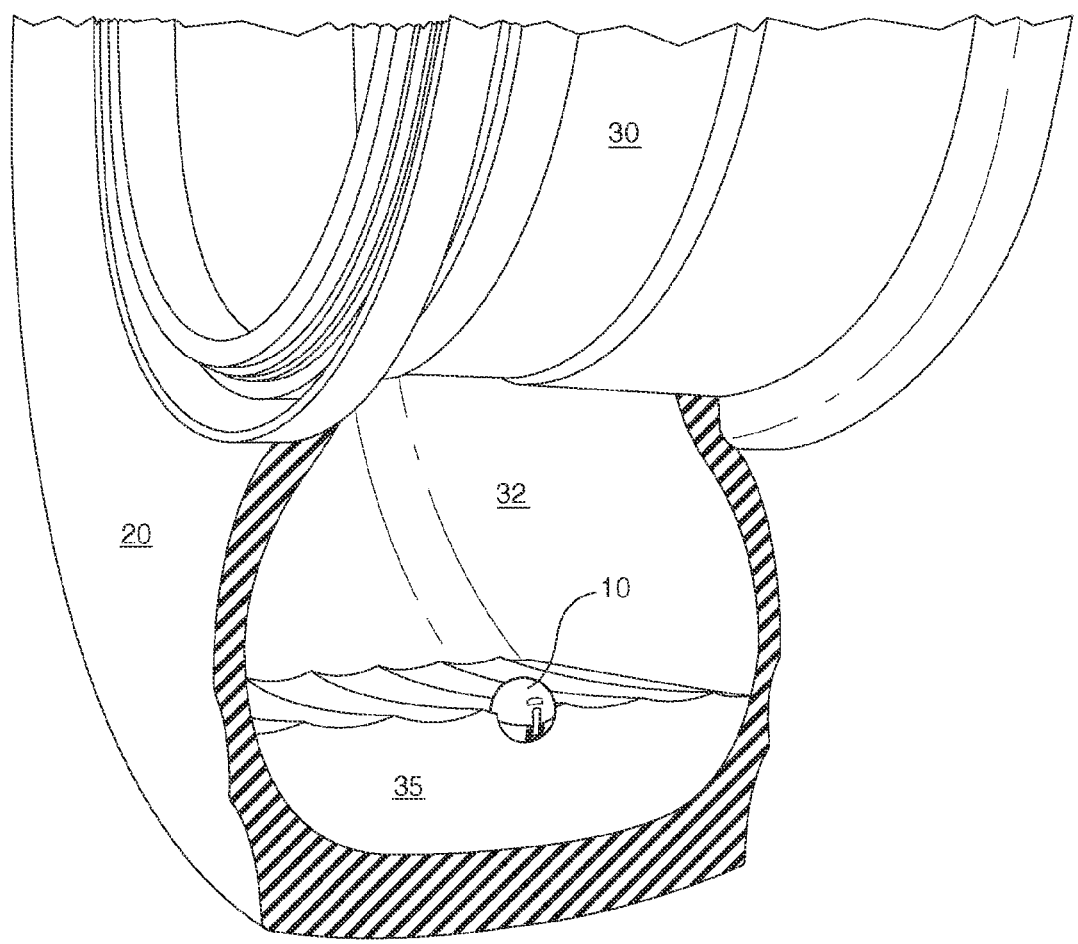
FIG. 1 shows an environment described in the current disclosure

The monitoring device 10 shown in FIG. 1 of the present disclosure is designed to be dropped into a tire 20 such that the monitoring device 10 is contained within a cavity 32 between the tire 20 and a rim 30 when the tire 20 is installed on the rim 30. The monitoring device 10 is free to move around the pressurized air cavity 32 as the tire and rim assembly rotates during operation of a vehicle. The tire 20 is primarily rubber with strengthening belts or cords as is known in the art. The rim 30 is typically steel or aluminum.

Figure 2:
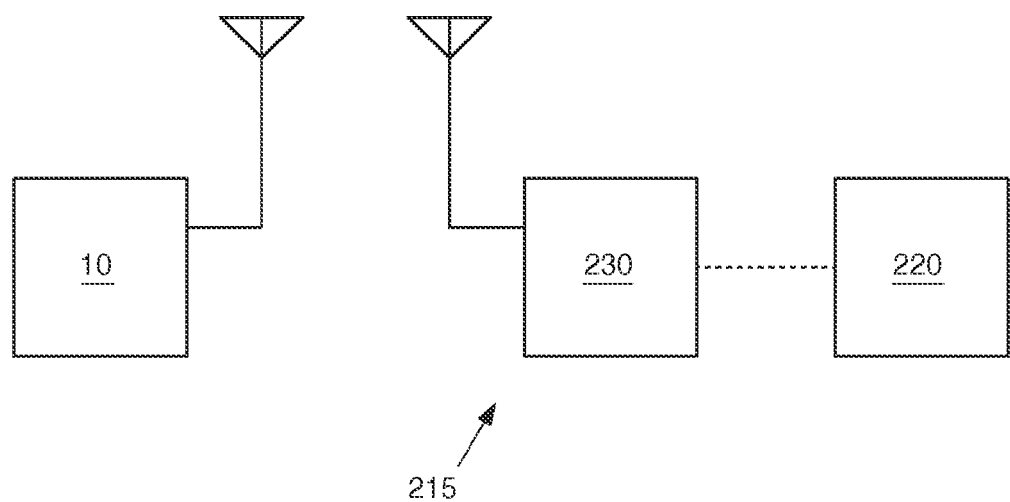
FIG. 2 shows a block diagram for a system for use with the current disclosure

A wireless tire monitoring system 215 shown in FIG. 2 comprises a monitoring device 10, a receiver unit 230, and a vehicle control system 220. The monitoring device 10 typically communicates the conditions inside the tire 20 to a vehicle control system 220. The sensor unit 40 is capable of sending and receiving signals to a vehicle-based receiver unit 230 that is communication with the vehicle control system. There may be multiple receiver units 230 on the vehicle. Upon receiving a signal from the monitoring device 10, the vehicle control system 220 may take a number of actions, such as displaying a status to an operator, sending a message over a wireless network, changing operating parameters, changing a vehicle speed limit, or altering a navigation course.

The monitoring device 10 can be dropped into the tire 20 before it is installed on the rim 30. The tire 20 would then be pressurized such that the tire and rim assembly would support the weight of the vehicle. Alternatively, the monitoring device 10 could be placed in the tire 20 when the tire 20 and rim 30 are partially separated during servicing. The drop-in installation technique allows the use of existing tire 20 and rim 30 designs with no modification. During normal operation, the monitoring device 10 will be confined within the cavity 32 and roll on the inside surface of the bottom of the tire 20 as the tire 20 rotates.

Tires used in heavy duty applications are often partially filled with a liquid. An example of such a liquid is the liquid sold under the trademark TIRE LIFE® sold by Fuller Bros. of Clackamas, Oreg. Such liquids block small leaks and prevent corrosion of the rim 30. Therefore, the monitoring device 10 should be capable of operating in a pressurized air cavity 32 as well as a pressurized air cavity 32 containing a liquid. When liquid is present, the monitoring device 10 should be capable of floating on top of the liquid layer.

Figure 3:
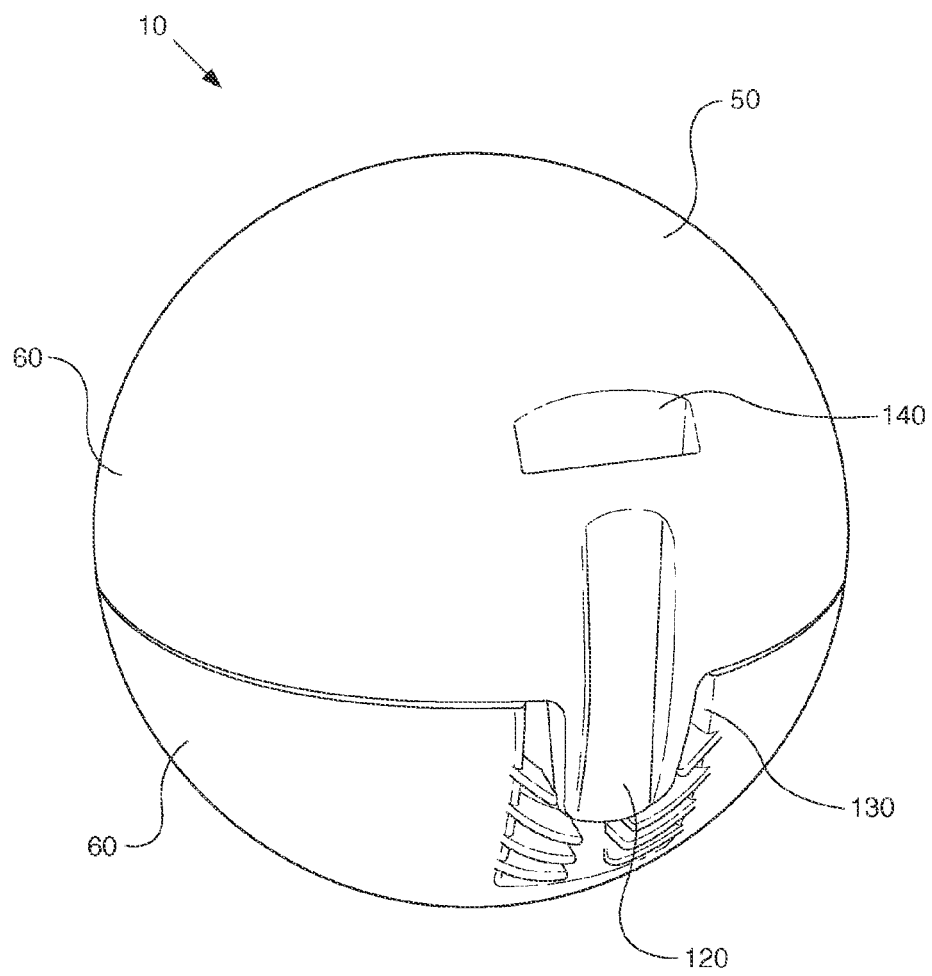
FIG. 3 shows a device as described in the current disclosure
Figure 4:
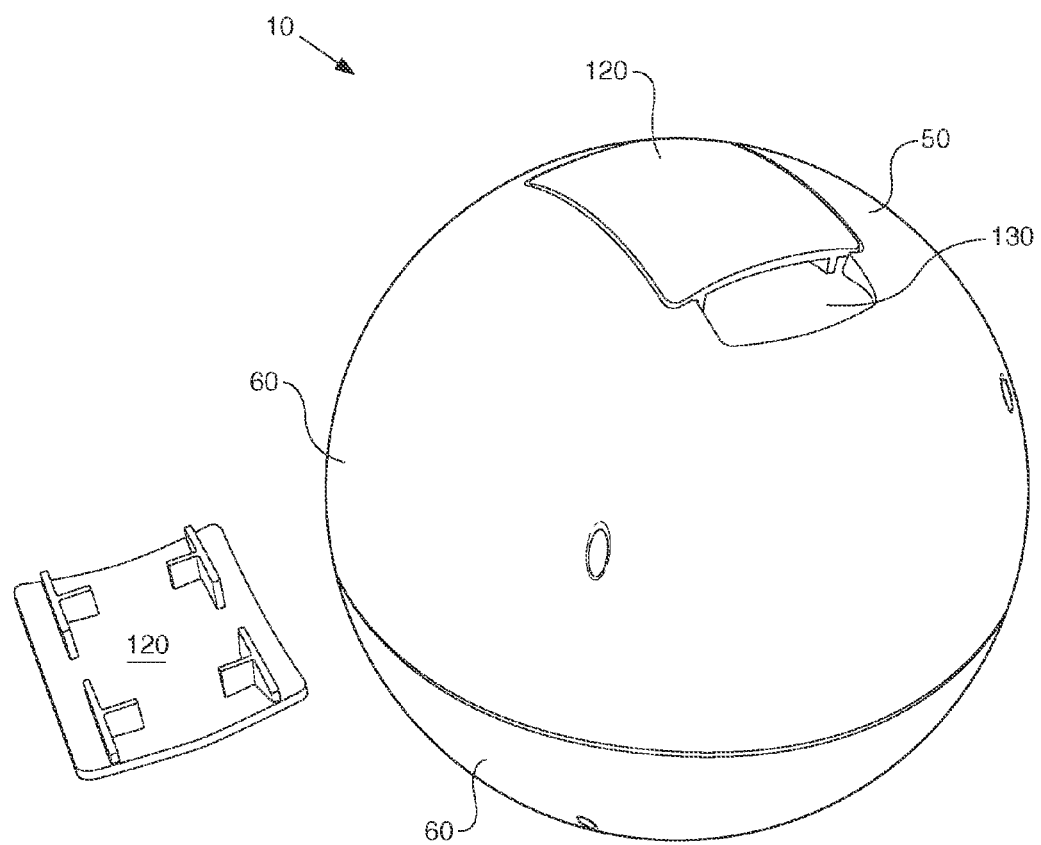
FIG. 4 shows a device as described as an alternative in the current disclosure
Figure 5:
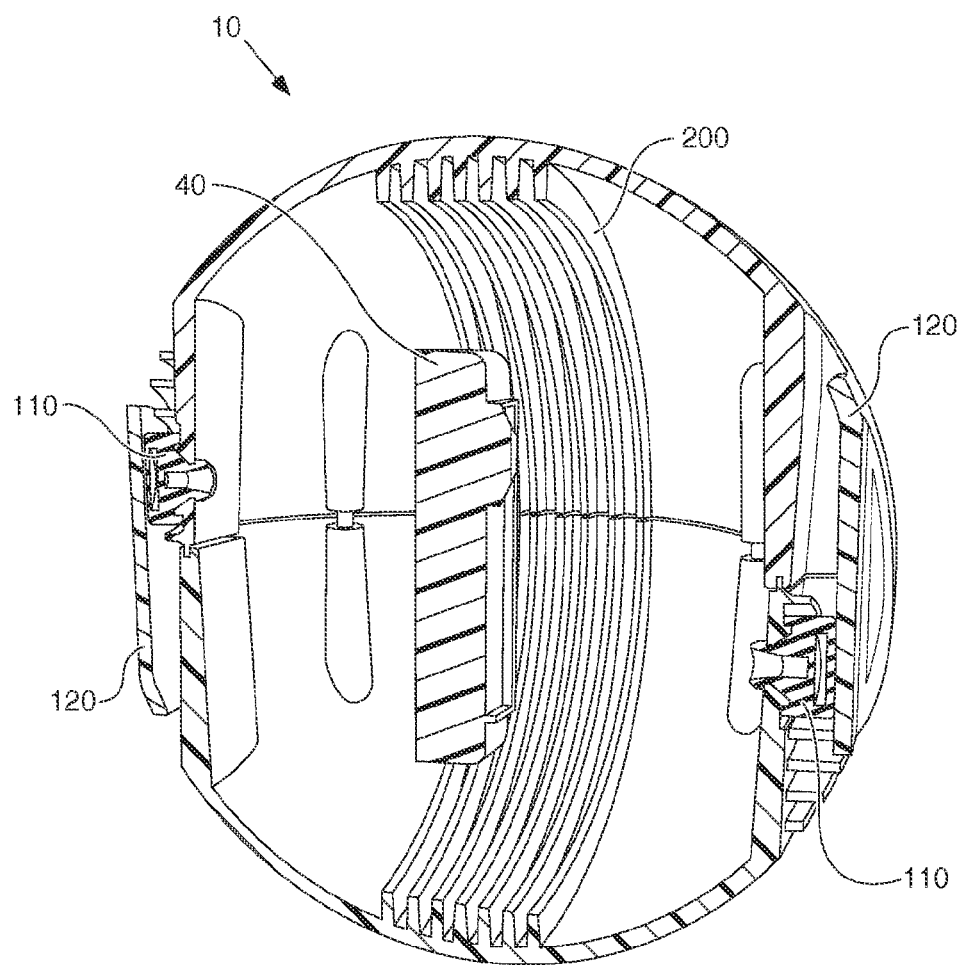
FIG. 5 shows an additional view of a device as described in the current disclosure

The monitoring device 10 shown in FIGS. 3, 4, and 5 comprises a sensor unit 40, a shell 50, and an encapsulant 60. The sensor unit 40 comprises electrical components needed to enable it to act as a wireless tire sensor as is known in the art. By way of example and not limitation, the electrical components could include an antenna, a central processing unit (CPU), a power source, a pressure sensor, or a temperature sensor. The electrical components of the sensor unit 40 may be arranged on a printed circuit board. The sensor unit 40 may be enclosed by a potting material that surrounds the electrical components and protects them from shock and vibration damage. Alternatively, the sensor unit 40 may be enclosed by a protective case made from a composite material. The potting material or protective case should include a provision for ambient air to communicate with the sensing components of the sensor unit 40. Examples of provisions include apertures or a permeable layer.

Figure 6:
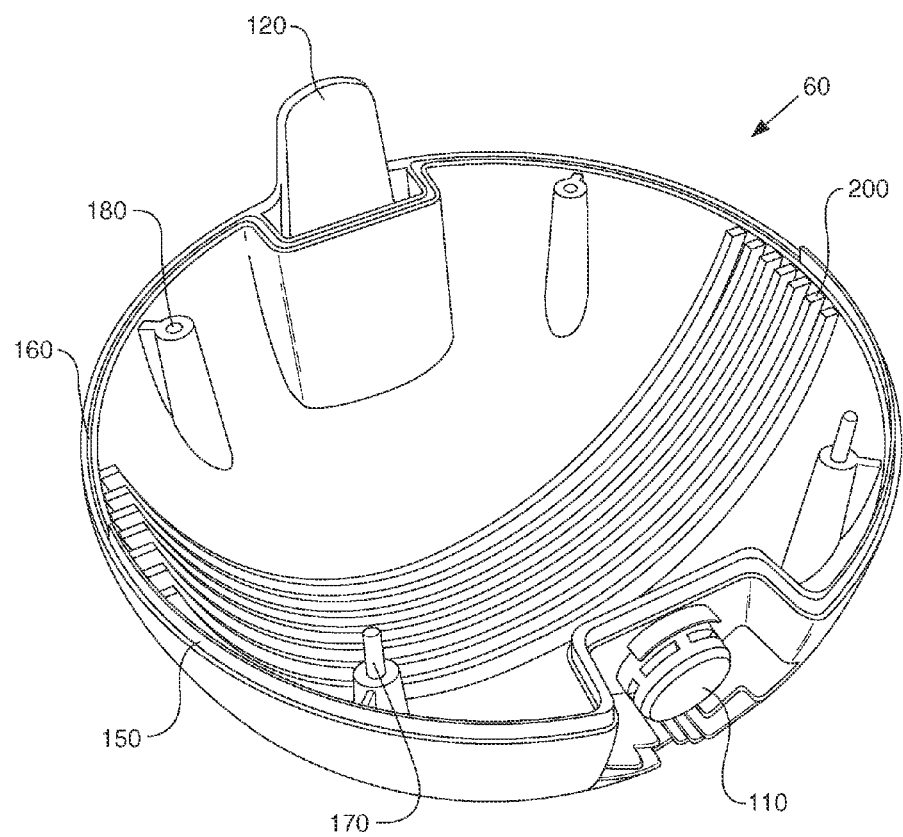
FIG. 6 shows an additional view of a device as described in the current disclosure

Referring to FIG. 6, the exterior of monitoring device 10 is formed by shell 50. The shell 50 is generally spherical in shape and is formed by combining two hemispherical halves 60. The hemispherical halves 60 are joined along a joint that defines an equator about shell 50. The hemispherical halves 60 may be identical. In this case, the hemispherical halves 60 may contain complimentary features that enable the hemispherical halves 60 to mate with like parts. Examples of complimentary features include tongue-in-groove, pin and hole, tab and slot, and so forth.

The hemispherical halves 60 can be joined by a number of methods, such as tongue-in-groove, pin and hole, or threaded fasteners. Refer to FIG. 6. The same hemispherical half 60 may contain portions of each complimentary joining feature set. For instance, the same hemispherical half 60 may contain a tongue feature 150 on a portion and a groove feature 160 on another portion so that the hemispherical half 60 is configured to be joined to an identical part. In another example, the same hemispherical half 60 may contain a pin feature 170 on a portion and a hole feature 180 on another portion so that the hemispherical half 60 is configured to be joined to an identical part. In another example, the same hemispherical half 60 may contain a through hole feature on one portion and a blind hole feature on another portion so that the hemispherical half 60 is configured to be joined to an identical part by inserting a threaded fastener. The hemispherical halves 60 may be joined together by a laser weld or by a chemical bond such as glue or epoxy. FIG. 4 shows an alternative configuration that may be more suitable for joining the two hemispherical halves 60 by laser welding.

The shell 50 is fitted with a vent 110. The vent 110 is configured such that liquids, dust, and dirt are blocked but gases and vapor are allowed to pass through. An example of a suitable vent is a Gore Protective Vent, available from W. L. Gore and Associates, Inc. of Elkton, Md. The liquid-proof vent 110 allows the monitoring device 10 to operate normally when used in a tire filled partially with liquid. The shell 50 may be fitted with more than one vent 110 such that at least one vent is always open to communication to air if the monitoring device 10 is used in a liquid environment. In one example, the vents 110 are located on generally opposite sides of the monitoring device 10.

The shell 50 may include a vent guard 120. The vent guard 120 extends over the vent 110 and protects the vent from impacts. The vent guard 120 may contribute to a portion of the generally spherical shape of shell 50, thereby offering no hindrance as the monitoring device 10 rolls on the inside of the tire 20. The vent guard 120 may be in the form of a cantilever shape formed into one portion of the hemispherical half 60. The other end of the cantilever shape may be supported by the other hemispherical half 60 when the two are joined to form the shell 50.

The vent guard 120 may form a space 125 between the vent guard 120 and the shell 50 above the vent 110 where liquid could collect and block the vent 110. It therefore may be necessary to provide a first drain port 130 and a second drain port 140 that will allow the liquid to drain away from vent 110. The first and second drain ports 130, 140 could be formed into the same hemispherical half 60 or they could be formed into different hemispherical halves 60. The means for draining liquid away from vent 110 may include a first drain port 130, a second drain port 140, or both. The means for draining liquid away from vent 110 may also include other features that support the vent guard 120. The features the surround the space 125 may be optimized to allow liquid to drain from vent 110.

Figure 7:
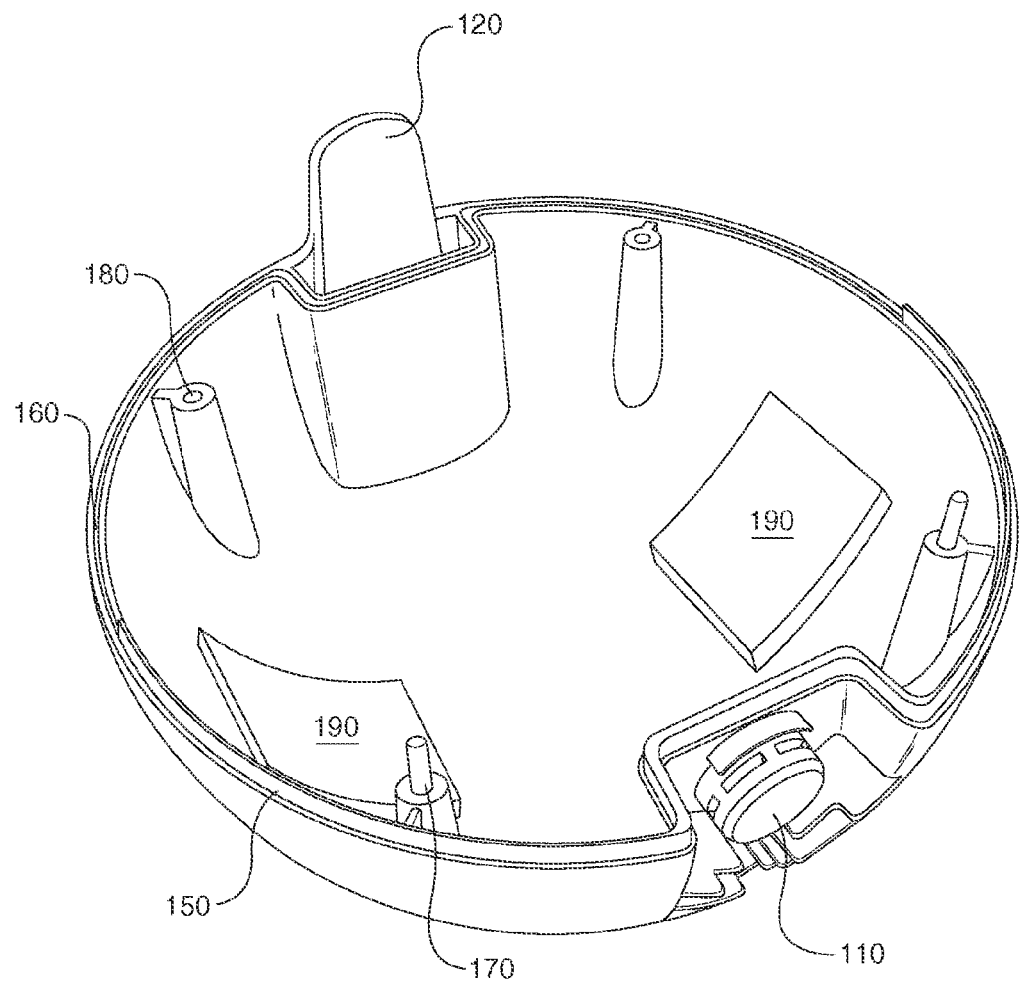
FIG. 7 shows an additional view of a device as described in the current disclosure

It may be desirable to influence the monitoring device 10 to roll or float in a certain orientation. For instance, if the monitoring device 10 is operating inside a tire, it may be desirable for the monitoring device 10 to roll in such a way that the vents 110 are not exposed to high rotational forces. If the monitoring device 10 is operating in a tire with liquid present, it may be desirable for the monitoring device 10 to float in such a way that the vents 110 are more likely to be exposed to air than liquid. In one example, the shell 50 may be equipped with two vents 110 located on opposite sides of the monitoring device 10. Refer to FIG. 5. A desired axis of rotation 210 can be defined that intersects the two vent guards 120. Additional mass can be distributed ninety degrees from the desired axis of rotation 210 such that centrifugal force will cause the monitoring device 10 to roll such that both vents 110 would be exposed to air rather than liquid. The additional mass could be in the form of additional material 200 formed as part of the shell 50. The additional material 200 could be formed in to ribs as shown in FIG. 6. The additional material 200 could be formed from the same material as the shell 50. Alternatively, dense material could be formed into the shell 50. The additional mass could be in the form of weights 190 added to the inside of the shell 50. See FIG. 7. The weights 190 could be of a dense material such as metal.

A monitoring device 10 used in the tires of large off-highway vehicles will also face a pressure change requirement not often encountered in on-highway applications. Large off-highway vehicles can change weight rapidly as a load is accepted or rejected. Consider, for instance, a large mine haul truck with a load capacity of 400 tons. Such a vehicle can raise its dump body and discharge the entire 400 ton load in seconds. The tire pressure can temporarily change by 60 kPa in four seconds. The diameter of the vent 110 must be sized to accept enough flow to prevent damage to the vent 110. Therefore, the volume of the monitoring device 10 (around 1500 cc in this example) and the flow capabilities of the vent 110 (around 2000 ml/min in this example) must be considered in order to meet the pressure change requirement.

An encapsulant 70 surrounds the sensor unit 40 and is enclosed by the shell 50. The encapsulant 70 serves several purposes, including:
Locating sensor unit 40 in the center of the shell 50
Protecting sensor unit 40 from shock and vibration
Conducting ambient conditions from outside the monitoring device 10 to the sensor unit 40
Providing buoyancy for the monitoring device 10

Figure 8:
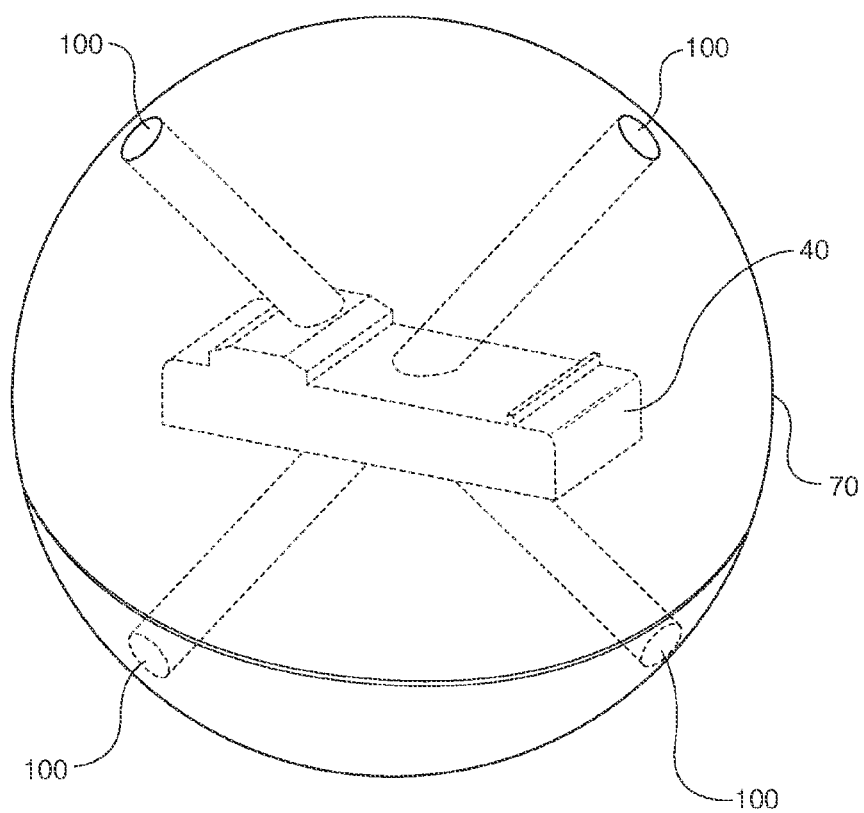
FIG. 8 shows a view of part of a device as described in the current disclosure

The encapsulant 70 shown in FIG. 8 should be made from a material that is stiff enough to support the sensor unit 40 in the center of the shell 50 while providing protection from shock and vibration. Examples include foam or rubber compounds. In the case of a foam, it should be made of a substantially 100% open-cell construction. Melamine foam is an example of a suitable type of foam. In an open-cell foam, the cell walls are broken and air fills most of the spaces in the material. This allows ambient conditions to communicate from one side of the open-cell foam to the other. The same property of open-cell foam makes it well-suited for use in environments that experience large pressure changes. Closed-cell foams may experience cell compression or bursting during large pressure changes. In the case of a rubber compound, the material should be formed with enough voids such that it can communicate ambient conditions from one side to the other. This could be achieved by forming voids when the material is made or by milling voids into the material after it is made.

The density of the encapsulant 70 should be chosen such the specific gravity of the monitoring device 10 is lower than the specific gravity of the liquid 35 that is to be used in the tire in order to ensure that the monitoring device will float. For instance, if the monitoring device 10 is to be used in water the specific gravity of the monitoring device 10 should be less than 1.0. If the monitoring device 10 needs to float higher in the liquid 35, a lower specific gravity could be chosen. A specific gravity of 0.50 would allow for half of the monitoring device 10 to be above the liquid 35. A specific gravity of 0.33 may allow for the monitoring device 10 to float high enough in the liquid 35 to ensure reliable communication with the receiver unit 230.

The encapsulant 70 is enclosed by shell 50 and therefore generally spherical. Sensor unit 40 is located in a void at the center of the encapsulant 70 sphere. Several methods can be used to insert the sensor unit 40. One example includes forming the encapsulant 70 into two solid hemispheres and then joining them. Another example includes boring a hole to the center of the encapsulant 70 sphere and then filling the hole with a plug of the same material. Another example includes a shape resembling a plus or cross from one perspective. The shape of the encapsulant 70 may be changed in order to tailor the stiffness to match the different dimensions of the sensor unit 40.

An encapsulant 70 made of open-cell foam is well-suited for communicating ambient conditions (such as pressure, temperature, humidity, etc.) through the material. However, communication of ambient conditions can be improved by creating channels 100 in the encapsulant 70. The channels 100 may be radially-oriented between the sensor unit 40 and the shell 50.

INDUSTRIAL APPLICABILITY

The monitoring device 10 is designed to be dropped into a tire 20 such that the monitoring device 10 is contained within a cavity 32 between the tire 20 and a rim 30 when the tire 20 is installed on the rim 30. The monitoring device 10 is free to move around the pressurized air cavity 32 as the tire and rim assembly rotates during operation of a vehicle. The tire 20 may contain a liquid 35 that is intended to prevent leaks and corrosion. The monitoring device 10 must therefore be designed to roll freely inside the tire 20 as it rotates as well as float on the liquid 35 if it is present.

Sensing allows scheduled maintenance or detection of a tire failure; tires on off-highway vehicles are very expensive, used on unfinished roads where rocks and debris are often encountered; allows an autonomous vehicle to detect a tire problem or failure; wireless tire monitoring system 215 can alert the operator when there is a problem with the tire 20. In the example of an autonomous machine, the vehicle control system 220 may take a number of actions, such as sending a message over a wireless network, changing operating parameters, changing a vehicle speed limit, or altering a navigation course.

What is claimed is:

1. A monitoring device for use inside a pneumatic tire, the monitoring device comprising:
    a sensor unit;
    an encapsulant surrounding said sensor unit; and
    a spherical shell formed by combining hemispherical halves, the spherical shell comprising:
        a vent;
        a vent guard, wherein the vent guard is in the form of a cantilever shape formed into at least one portion of at least one of the hemispherical halves and extending over the vent; and
        wherein said spherical shell surrounds said encapsulant.

2. The monitoring device in claim 1, wherein the vent is liquid-proof.

3. The monitoring device in claim 1, wherein said hemispherical halves are identical.

4. The monitoring device in claim 1, wherein said spherical shell further comprises a drain port.

5. The monitoring device in claim 1, wherein said spherical shell further comprises a means to direct liquid away from said vent.

6. The monitoring device in claim 1, wherein said hemispherical halves are joined via complimentary features.

7. The monitoring device in claim 1, wherein said monitoring device has a specific gravity of less than one.

8. The monitoring device in claim 1, wherein said spherical shell comprises two vents located on opposite sides of the monitoring device and two vent guards, with each of the two vent guards extending over one of the two vents.

9. The monitoring device in claim 8, wherein said shell is made from a predetermined material; and mass is configured in said hemispherical halves such that an axis of rotation of the monitoring device aligns substantially with an axis extending through the two vent guards.

10. The monitoring device in claim 9, wherein said mass is in the form of additional shell material.

11. The monitoring device in claim 9, wherein said mass is in the form of additional material denser than said shell material.

12. The monitoring device in claim 1, wherein said encapsulant is made of an open-cell foam.

13. The monitoring device in claim 1, wherein said encapsulant includes channels for conducting ambient conditions to the sensor unit.

14. A system for monitoring conditions inside a pneumatic tire, the system comprising:
a vehicle control system in communication with a receiver unit;
the receiver unit configured to communicate with a monitoring device;
the monitoring device comprising:
a sensor unit;
an encapsulant surrounding said sensor unit;
a spherical shell formed by combining hemispherical halves, the spherical shell comprising:
a vent;
a vent guard, wherein the vent guard is in the form of a cantilever shape formed into at least one portion of at least one of the hemispherical halves; and
wherein said spherical shell surrounds said encapsulant.

15. The system in claim 14, wherein the vent is liquid-proof.

16. The system in claim 14, wherein said hemispherical halves are identical.

17. The system in claim 14, wherein said spherical shell further comprises a drain port.

18. The system in claim 14, wherein said spherical shell further comprises a means to direct liquid away from said vent.

19. The system in claim 14, wherein said hemispherical halves are joined via complimentary features.

20. The system in claim 14, wherein said monitoring device has a specific gravity of less than one.

21. The system in claim 14, wherein said spherical shell comprises two vents located on opposite sides of the monitoring device and two vent guards, with each of the two vent guards extending over one of the two vents.

22. The system in claim 21, wherein said shell is made from a predetermined material; and mass is configured in said hemispherical halves such that an axis of rotation of the monitoring device aligns substantially with an axis extending through the two vent guards.

23. The system in claim 22, wherein said mass is in the form of additional shell material.

24. The system in claim 22, wherein said mass is in the form of additional material denser than said shell material.

25. The system in claim 14, wherein said encapsulant is made of an open-cell foam.

26. The system in claim 14, wherein said encapsulant includes channels for conducting ambient conditions to the sensor unit.

* * * * *